(12) United States Patent
Garg et al.

(10) Patent No.: US 8,379,947 B2
(45) Date of Patent: Feb. 19, 2013

(54) SPATIO-TEMPORAL IMAGE RECONSTRUCTION USING SPARSE REGRESSION AND SECONDARY INFORMATION

(75) Inventors: Rahul Garg, Yorktown Heights, NY (US); Monu Kedia, Jharkhand (IN); Yogish Sabharwal, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 12/790,199

(22) Filed: May 28, 2010

(65) Prior Publication Data

US 2011/0293193 A1    Dec. 1, 2011

(51) Int. Cl.
G06K 9/00 (2006.01)
(52) U.S. Cl. .......................... 382/128; 324/309; 600/407
(58) Field of Classification Search .................. 382/128; 600/407
See application file for complete search history.

(56) References Cited

U.S. PATENT DOCUMENTS

| | | | |
|---|---|---|---|
| 5,603,322 A | 2/1997 | Jesmanowicz et al. | |
| 6,038,466 A * | 3/2000 | Haselhoff | 600/410 |
| 6,088,611 A * | 7/2000 | Lauterbur et al. | 600/407 |
| 6,295,464 B1 * | 9/2001 | Metaxas | 600/407 |
| 6,539,246 B2 | 3/2003 | Heid | |
| 7,180,074 B1 | 2/2007 | Crosetto | |
| 7,283,859 B2 * | 10/2007 | Madore | 600/410 |
| 7,417,231 B2 | 8/2008 | Defrise et al. | |
| 7,423,430 B1 | 9/2008 | Sharif et al. | |
| 7,495,437 B2 * | 2/2009 | Griswold et al. | 324/307 |
| 7,649,354 B2 * | 1/2010 | Bayram et al. | 324/309 |
| 7,777,487 B2 * | 8/2010 | Ying et al. | 324/309 |
| 7,834,623 B2 * | 11/2010 | Iwadate et al. | 324/307 |
| 8,115,485 B1 * | 2/2012 | Maier et al. | 324/318 |
| 8,217,650 B2 * | 7/2012 | Sueoka | 324/309 |
| 2006/0208730 A1 * | 9/2006 | Kozerke et al. | 324/307 |
| 2006/0224062 A1 | 10/2006 | Aggarwal et al. | |
| 2008/0279436 A1 | 11/2008 | Razifar et al. | |
| 2008/0310697 A1 | 12/2008 | Razifar et al. | |
| 2008/0319304 A1 | 12/2008 | Declerck et al. | |
| 2009/0074279 A1 | 3/2009 | Razifar et al. | |
| 2009/0262996 A1 | 10/2009 | Samsonov et al. | |

OTHER PUBLICATIONS

D. Visvikis et al., "A Posteriori Respiratory Motion Gating of Dynamic PET Images," IEEE, Nuclear Science Symposium Record, Oct. 2003, pp. 3276-3280, vol. 5.

(Continued)

*Primary Examiner* — Hadi Akhavannik
(74) *Attorney, Agent, or Firm* — Vazken Alexanian; Ryan, Mason & Lewis, LLP

(57) ABSTRACT

A spatio-temporal image of an object is reconstructed based on captured data characterizing the object. The spatio-temporal image comprises a plurality of spatial images in respective time intervals, and at least a given one of the spatial images in one of the time intervals is reconstructed using not only captured data from a frame associated with that time interval but also captured data associated with one or more additional frames associated with other time intervals. The spatio-temporal image may be reconstructed by iteratively obtaining a solution to a minimization or maximization problem in a sparse domain and transforming the solution to an image domain. The transformation between the sparse domain and the image domain may utilize a spatio-temporal transformation implemented using a plurality of basis functions, one or more of which may be determined at least in part based on secondary information associated with the imaged object.

21 Claims, 2 Drawing Sheets

OTHER PUBLICATIONS

S. Pavlopoulos et al., "Analysis and Interpretation of Dynamic FDG PET Oncological Studies Using Data Reduction Techniques," BioMedical Engineering Online, Oct. 2007, pp. 1-13, vol. 6, No. 36.

M.V. Narayanan et al., "Application of the Karhunen-Loève Transform to 4D Reconstruction of Cardiac Gated SPECT Images," IEEE Transactions on Nuclear Science, Aug. 1999, pp. 1001-1008, vol. 46, No. 4.

J. Nuyts et al., "Cardiac Phantom Measurement Validating the Methodology for a Cardiac Multi-Center Trial with Positron Emission Tomography," European Journal of Nuclear Medicine and Molecular Imaging, Apr. 2002, 7 pages, vol. 29.

M.E. Kamasak et al., "Direct Reconstruction of Kinetic Parameter Images from Dynamic PET Data," IEEE Transactions on Medical Imaging, May 2005, pp. 636-650, vol. 24, No. 5.

T. Blumensath et al., "Fast Compressed-Sensing Reconstruction for Magnetic-Resonance Imaging," SPIE Newsroom, Jan. 2009, 3 pages.

M.N. Wernick et al., "Fast Spatio-Temporal Image Reconstruction for Dynamic PET," IEEE Transactions on Medical Imaging, Mar. 1999, pp. 185-195, vol. 18, No. 3.

"Automation of Gated PET-CT Workflow," www.ip.com, Nov. 2006, 9 pages.

"Real-Time Respiratory Trace Analysis for Respiratory Gated PET / CT," www.ip.com, Nov. 2009, 8 pages.

I.K. Hong et al., Ultra Fast Symmetry and SIMD-Based Projection-Backprojection (SSP) Algorithm for 3-D PET Image Reconstruction, IEEE Transactions on Medical Imaging, Jun. 2007, pp. 789-803, vol. 26, No. 6.

U.S. Appl. No. 12/549,964, filed Aug. 28, 2009 in the name of R. Garg et al., and entitled "Reconstruction of Images Using Sparse Representation."

* cited by examiner

SPATIO-TEMPORAL IMAGE RECONSTRUCTION USING SPARSE REGRESSION AND SECONDARY INFORMATION

FIELD OF THE INVENTION

The present invention relates generally to image processing, and more particularly to techniques for reconstruction of spatio-temporal images from captured data.

BACKGROUND OF THE INVENTION

Many imaging applications involve generating a sequence of two-dimensional (2D) or three-dimensional (3D) images representing a particular object of interest in respective time intervals. Examples include a wide variety of well-known medical imaging applications such as magnetic-resonance imaging (MRI), positron emission tomography (PET) and computed tomography (CT). The image sequences generated in these and other imaging applications are also commonly referred to as spatio-temporal images, in that the image data varies both in the spatial domain, that is, within each of the individual 2D or 3D images, as well as in the temporal domain, that is, from time interval to time interval.

In a typical arrangement, raw data is captured by a scanner as a series of frames, with each frame corresponding to a time interval. The captured data for each frame is processed to reconstruct a spatial image representing the state of the object in the corresponding time interval. The image reconstruction process may be formulated as a mathematical optimization problem based on a physical model characterizing data capture by the scanner. Spatial images are usually reconstructed individually on a frame-by-frame basis, and these spatial images are then aggregated together to provide the spatio-temporal image.

In situations involving imaging of repetitive phenomena such as heart beat or respiration, raw data is often captured for multiple cycles of repetition, using so-called "gated" arrangements. Each cycle of repetition is subdivided into multiple frames, with each frame of a given cycle representing a corresponding time interval in that cycle. Spatial images are reconstructed independently for each time interval using the frames associated with that time interval, which would include one frame from each of the multiple cycles. Again, these spatial images are then aggregated together to provide the spatio-temporal image.

There is an inherent tradeoff between spatial resolution and temporal resolution in arrangements such as those described above. For example, one can attempt to improve the temporal resolution by increasing the number of frames captured within a given time period, but this will decrease the amount of data captured in each frame, leading to a poorer spatial resolution. Also, it is often desirable to limit the scan time as certain of the medical imaging applications may involve exposing a patient to significant levels of potentially harmful radiation.

SUMMARY OF THE INVENTION

Illustrative embodiments of the present invention provide improved techniques for spatio-temporal image reconstruction in which a given spatial image associated with one time interval is reconstructed using captured data not only from the corresponding frame but also captured data from other frames associated with other time intervals. These techniques take both spatial redundancy and temporal redundancy into account in reconstructing a spatio-temporal image.

In addition to exploiting both spatial and temporal redundancy, the image reconstruction may use information from secondary sources, such as prior specific or general information about the object under investigation, to provide further improvements in the quality of reconstruction.

In accordance with one aspect of the invention, a spatio-temporal image of an object is reconstructed based on captured data characterizing the object. The spatio-temporal image comprises a plurality of spatial images in respective time intervals, and at least a given one of the spatial images in one of the time intervals is reconstructed using not only captured data from a frame associated with that time interval but also captured data associated with one or more additional frames associated with other time intervals. The spatio-temporal image may be reconstructed by iteratively obtaining a solution to a minimization or maximization problem in a sparse domain and transforming the solution to an image domain.

The transformation between the sparse domain and the image domain may utilize a spatio-temporal transformation implemented using a plurality of basis functions, one or more of which may be determined at least in part based on secondary information associated with the imaged object.

The illustrative embodiments advantageously allow temporal resolution to be improved without significantly compromising the spatial resolution, since the captured data from multiple frames is used to reconstruct the spatial image corresponding to a given one of the frames. Also, spatial resolution can be improved without compromising temporal resolution and without increasing the scan time. Additionally or alternatively, scan time can be substantially reduced for a given level of spatial resolution, thereby reducing patient exposure to potentially harmful radiation.

These and other features and advantages of the present invention will become more apparent from the accompanying drawings and the following detailed description.

DETAILED DESCRIPTION OF PREFERRED EMBODIMENTS

The present invention will be illustrated herein in conjunction with exemplary image processing systems and associated techniques for spatio-temporal image reconstruction. It should be understood, however, that the invention is not limited to use with the particular types of systems and techniques disclosed. The invention can be implemented in a wide variety of other image processing systems, using alternative image reconstruction techniques.

Figure 1:
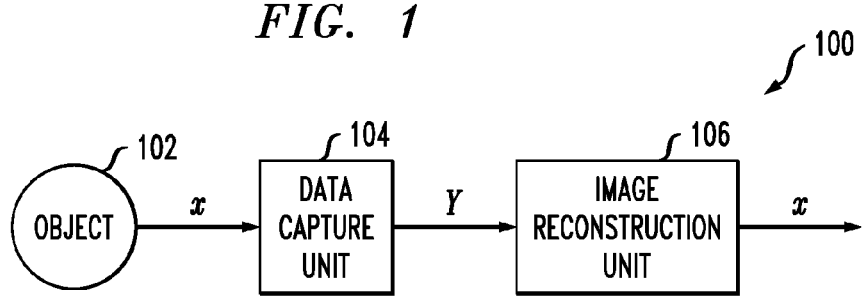
FIG. 1 is a block diagram of an image processing system in an illustrative embodiment of the invention.

FIG. 1 shows an image processing system 100 in an illustrative embodiment of the invention. Data characterizing an object under investigation 102 is captured by a data capture unit 104, which may comprise a scanner, or more particularly a medical imaging scanner such as an MRI, PET or CT scanner. This raw data is assumed for purposes of the present embodiment to be captured as a series of frames, with each frame corresponding to a time interval. The captured data is processed in an image reconstruction unit 106 to generate a spatio-temporal image. The object 102 may comprise a human subject, an animal subject or any other object, or a portion of such an object. Other types of scanners may be used in implementing an embodiment of the invention, including those commonly associated with scanning techniques such as functional MRI (fMRI), nuclear MRI (NMRI), single photon emission computed tomography (SPECT), or high-resolution research tomography (HRRT).

In the conventional image reconstruction techniques described previously, spatial images are usually reconstructed individually on a frame-by-frame basis, and these spatial images are then aggregated together to provide the spatio-temporal image. These conventional techniques therefore reconstruct each spatial image using only the captured data from its corresponding frame, or corresponding set of frames associated with a common time interval and including one frame from each cycle in a so-called "gated" arrangement.

The image reconstruction unit 106, in contrast to these conventional arrangements, is configured such that a given spatial image associated with one time interval is reconstructed using captured data not only from the corresponding frame but also captured data from other frames associated with other time intervals. Accordingly, the image reconstruction unit takes both spatial and temporal redundancy into account in reconstructing a spatio-temporal image. The captured data from multiple frames is therefore used to reconstruct the spatial image corresponding to a given one of the frames. In addition to exploiting both spatial and temporal redundancy, the image reconstruction unit 106 uses information from secondary sources, such as prior specific or general information about the object under investigation, to provide further improvements in the quality of reconstruction. The secondary information may be information obtained from secondary sources using other types of imaging modalities or measurements.

Advantageously, this allows temporal resolution to be improved without significantly compromising the spatial resolution, resulting in improved spatio-temporal image quality and thereby enhanced diagnostic capabilities. In addition, spatial resolution can be improved without compromising temporal resolution and without increasing the scan time. The disclosed techniques can also be used to reduce scan time, thereby improving the efficiency of the scanning equipment (e.g., MRI, PET or CT scanners can take more images in a given time) and reducing the harmful effects of scanning on the object being imaged (e.g., by decreasing the radiation exposure to patients being scanned).

Figure 2:
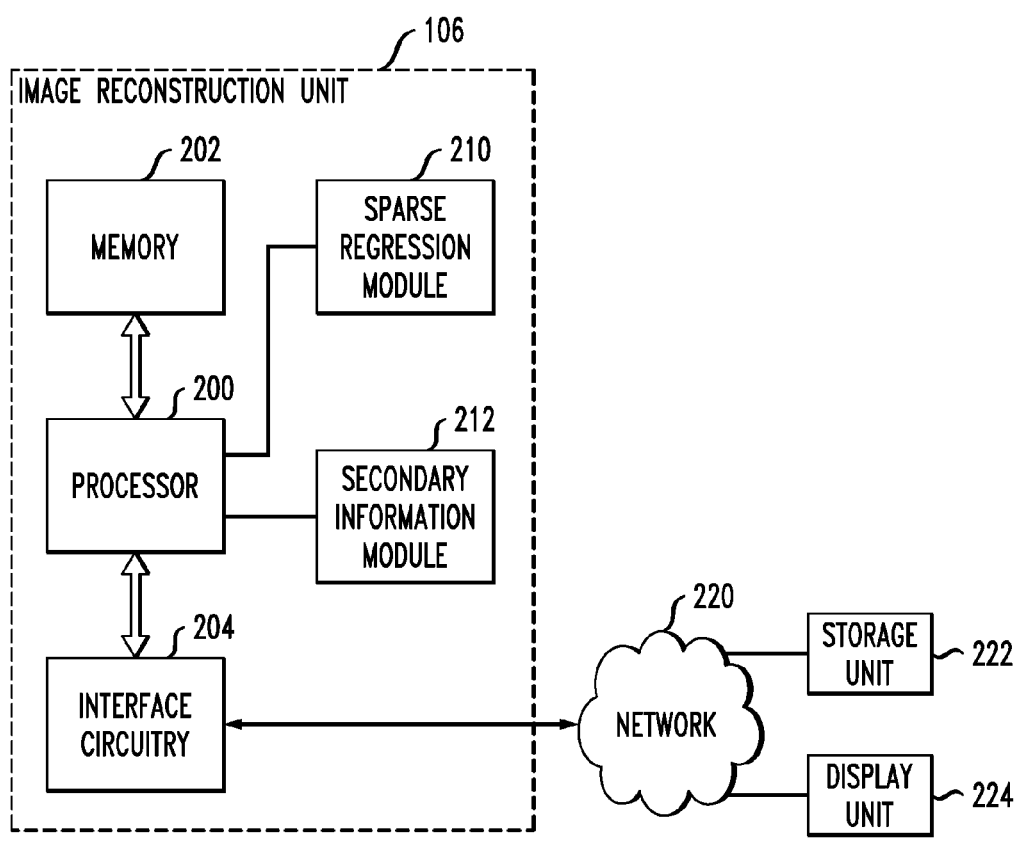
FIG. 2 is a block diagram showing a more detailed view of an image reconstruction unit of the FIG. 1 image processing system as well as additional elements of the FIG. 1 system.

As shown in greater detail in FIG. 2, the image reconstruction unit 106 comprises a processor 200 coupled to a memory 202 and to interface circuitry 204. Associated with the processor 200 are a sparse regression module 210 and a secondary information module 212. These modules are used in spatio-temporal image reconstruction in the illustrative embodiments, in a manner to be described below.

The memory 202 may store instructions or other program code that is executed by the processor 200 in performing functions associated with spatio-temporal image reconstruction. The memory 202 is an example of what is more generally referred to herein as a computer program product having embodied therein executable program code, and may comprise electronic memory such as RAM or ROM, magnetic memory, disk-based memory, optical memory or other types of storage elements, in any combination. The processor 200 may comprise one or more microprocessors, microcontrollers, application-specific integrated circuits (ASICs), graphical processing units (GPUs) or other processing devices, in any combination, for executing program code stored in memory 202. The modules 210 and 212 may be implemented at least in part in the form of such program code.

The interface circuitry 204 interfaces the image reconstruction unit 106 with a network 220 that is coupled to an external storage unit 222 and a display unit 224. The storage unit 222 may be used to store raw data captured by the data capture unit 104, processed or unprocessed information obtained from secondary sources, as well as spatio-temporal images generated by the image reconstruction unit 106. The display unit 224, which may comprise one or more monitors or projectors, is used for viewing of the spatio-temporal images.

It is to be appreciated that the particular arrangements of system 100 and image reconstruction unit 106 as shown in FIGS. 1 and 2 are by way of illustrative example only. Alternative embodiments may include other arrangements of system elements suitably configured to support spatio-temporal image reconstruction of the type described herein. Examples of such arrangements may be found in U.S. patent application Ser. No. 12/549,964, filed Aug. 28, 2009 and entitled "Reconstruction of Images Using Sparse Representation," which is commonly assigned herewith and incorporated by reference herein.

The image reconstruction unit 106 or portions thereof may be implemented at least in part in the form of an integrated circuit. For example, in a given implementation the image reconstruction unit 106 may be embodied in a single ASIC or other type of processing device, such as, for example, GPUs, computers, servers, mobile communication devices, etc.

The spatio-temporal image reconstruction process implemented in the image reconstruction unit 106 will now be described in greater detail.

The image of the object 102 for a given time interval t may be represented as an n-dimensional vector $x^t$, and the data capture unit 104 may be characterized as producing a corresponding m-dimensional vector of observations given by $Y^t = Px^t + \Psi^t$, where P is an n by m matrix representing the projection of the object 102 in the data capture unit, and is also referred to as a system matrix, and $\Psi^t$ represents the noise in the measurement process implemented by the data capture unit. The projection matrix will generally depend on the type of data capture device used, and may be a line integral matrix, a Fourier transform matrix, a specialized system matrix, etc. Numerous such projection matrices are known in the art.

The image reconstruction unit 106 receives $Y^t$ from the data capture unit 104 and reconstructs the image vector $x^t$ for a given value of t utilizing the observations $Y^t$ and the noise $\Psi^t$ for multiple values of t. Let $$Y = Col(Y^1, Y^2, \ldots, Y^d)$$

represent a vector of size md obtained by stacking the observations $Y^t$ for t in the range 1 to d. Similarly let $$x = Col(x^1, x^2, \ldots, x^d)$$

and $$105 = Col(\Psi^1, \Psi^2, \ldots \Psi^d)$$

respectively represent vectors of size nd and md obtained by stacking the images $x^t$ and the noise $\Psi^t$ for t in the range 1 to d. The vector x therefore represents the spatio-temporal image. Let $$\underline{P} = Diag(P, P, \ldots P)$$

represent an md by nd block-diagonal matrix obtained by replicating the system projection matrix P, d times. Now the spatio-temporal image reconstruction problem may be formulated as $$Y=\underline{P}x+\Psi$$

where Y is the vector representing the spatio-temporal observations, P is the block diagonal matrix representing the spatio-temporal projection of the spatio-temporal image x onto the observations Y and Ψ is the spatio-temporal noise. This problem may be solved by finding a spatio-temporal image x that minimizes or maximizes an objective function $f(Y, \underline{P}, x, \Psi)$.

The image reconstruction unit 106 in the present embodiment is configured to solve the above-noted problem in another domain z instead of in the spatio-temporal image domain x. The domain of z is selected in a way that the solution is likely to have a relatively small number of non-zero entries in z (i.e., the solution is sparse in the z domain). The domain of Y is the domain of spatio-temporal observations, also referred to herein as the projection domain. The spatio-temporal domains of x and z are referred to herein as the image domain and the sparse domain, respectively.

The spatio-temporal domain of z is constructed using a transformation matrix T, which may be obtained using one or more spatio-temporal mathematical transforms and the above-noted information from secondary sources. Formally, $$x=Tz$$

where T is an nd by $(n_s \cdot n_t + n_{st})$ spatio-temporal transformation matrix. The transformation matrix T is constructed using $n_s$ spatial, $n_t$ temporal and $n_{st}$ spatio-temporal basis functions. The cross product of the spatial and temporal basis functions gives $n_s \cdot n_t$ columns of the matrix T and the spatio-temporal basis functions give the remaining $n_{st}$ columns of T.

Let $b^k()$ represent the $k^{th}$ spatio-temporal basis function. We denote the value of this function at a spatial location j and temporal location t in the spatio-temporal domain as $b^k(j, t)$ where k takes values from 1 to $n_{st}$, j takes values from 1 to n and t takes values from 1 to d. The spatial basis functions are denoted as $s^l(j)$ and the temporal basis functions are denoted as $\tau^k(t)$ where l takes values from 1 to $n_s$, j takes values from 1 to n, k takes values from 1 to $n_t$, and t takes values from 1 to d.

The cross product of the spatial and temporal basis functions gives rise to $n_s \cdot n_t$ spatio-temporal basis functions as given below:

$$c^{lk}(j,t)=s^l(j)\cdot\tau^k(t),$$

where l takes values from 1 to $n_s$, j takes values from 1 to n, k takes values from 1 to $n_t$ and t takes values from 1 to d.

It should be noted that the system matrix P and the transformation matrix T are not required to be stored explicitly in the memory. In fact, in many state-of-the-art systems, matrices such as these will not be explicitly stored but are instead implicitly computed on the fly. The matrix-multiplication notations used herein may therefore be viewed as convenient shorthand for the description of the corresponding algorithm. In practice, fast methods to compute the transforms (such as FFTs and/or wavelets) as well as fast methods to compute projection and back projection without explicitly storing some portions of the matrices T and P may be used, and such methods are well understood by those skilled in the art.

The transform domain basis functions can be obtained in several ways. For example, the basis functions can be constructed from spatial only basis functions multiplied with very simple temporal functions, temporal only basis functions multiplied with very simple spatial functions, spatio-temporal basis functions and cross products of spatial and temporal basis functions. There are at least two sources of the basis functions used in the construction. The first source comprises known mathematical transforms used in signal processing, image processing, medical imaging, etc. The other source is secondary information.

As noted above, the secondary information may comprise specific information or general information, obtained from one or more secondary sources. The specific information may include information derived from the object being imaged, and the general information may include information derived from either a mathematical model of the class of the object being imaged or data obtained from multiple objects belonging to the same class.

Examples of specific information about the object being imaged may include a spatial, temporal or spatio-temporal image of the same object obtained using another imaging modality. As a more particular example, specific information used to reconstruct a PET image may comprise an MRI and/or CT image of the same object. Another example of specific information is time series data representing radioactivity level in arterial blood of the person being imaged in a PET scanner. Such a time series may be obtained by periodically sampling the blood and measuring its radioactivity using another device. Similarly, for fMRI image reconstruction, the specific information may be a high-resolution MRI image, PET image or CT image of the same subject, or time series data relating to heart beats, eye movement, respiration, head movements, or characteristics of the external stimulus administered to the subject (e.g., radioactivity concentration of the air being inhaled or some attributes of visual and/or auditory stimulus presented to the subject while scanning is under progress), or other physical characteristics of the subject.

Examples of general information about the object being imaged may include information derived from a physical or simulation-based model of the object or from multiple images of similar objects. As a more particular example, if the object being scanned is a human brain, then the general information may be different atlases of the human brain derived from scans of multiple subjects, or spatial or spatio-temporal basis functions for specific parts of the brain based on singular value decomposition (SVD) of multiple brain scans.

The transform domain basis functions may more particularly be configured as follows:

Spatial only basis functions multiplied with very simple temporal functions: In this construction, spatial basis functions such as 3D FFT, 3D DCT, 3D spatial prior images, components of segmented spatial prior images, etc. are crossed with very simple temporal functions such as shifted delta functions to form the basis.

Temporal only basis functions multiplied with very simple spatial functions: In this construction, temporal basis functions such as B-splines or temporal signals derived using information from secondary sources are crossed with very simple spatial basis function such as pixel basis functions.

Spatio-temporal basis functions: These may include 4D mathematical transforms such as 4D FFT, 4D DCT, 4D wavelet transform, 4D HAAR transform, and prior spatio-temporal images.

Cross product of spatial and temporal basis functions: In this construction, spatial basis functions are crossed with temporal basis functions. The spatial basis functions may include 3D mathematical transforms such as 3D FFT, 3D DCT, 3D HAAR, Curvelet transform, prior 3D spatial images, segmented image components from priors, general information based basis like brain atlases using multiple brain scans, heart models derived from physics and other heart scans, SVD data derived from multiple brain scans, etc. The temporal basis functions may include mathematical transforms such as 1D Wavelet transform, 1D B-splines, 1D FFT, and specific secondary information basis functions such as heart rate, heart beat and pulse breathing information.

As mentioned previously, the image reconstruction unit 106 is configured to determine a spatio-temporal image x that minimizes or maximizes an objective function $f(Y, P, x, \Psi)$, but solves this problem in the sparse domain z instead of in the spatio-temporal domain x. Although many different types of objective functions may be used, two particular examples based on log-likelihood and least square functions are shown below:

1. Log-likelihood function:

$$f(Y, \underline{P}, T, z, \psi) = \sum_{i=0}^{i=md-1} Y_i \log(\underline{P}Tz - \psi)_i - (\underline{P}Tz - \psi)_i - \log Y_i + R(x)$$

2. Least square function:

$$f(Y,\underline{P},T,z,\psi) = \|Y - \underline{P}Tz - \psi\|^2 - R(x)$$

where:
Y is the stacked observation
T is the transform matrix
$\underline{P}$ is the block diagonal system matrix
z is the spatio-temporal image in the sparse domain
x=Tz is the spatio-temporal image
$\Psi$ is the spatio-temporal noise
R(x) is a penalty term, also referred to as the regularization penalty The penalty term is added or subtracted depending on the minimization or maximization goal of the objective function in order to obtain smoother and less noisy reconstruction output. The penalty term may take any of a number of different forms. For example, the penalty term may be one of the norms of the image, e.g., $R(x^t) = (\Sigma_{i=1}^n |x_i|^q)^{1/q}$, where q represents the $q^{th}$ norm, or it can also consider pixel neighbors of the pixel, e.g., $$R(x^t) = \left( \sum_{i=1}^{n} \sum_{k \in N_i} w_{ik} \varphi(x_i, x_k) \right)$$

where $\varphi$ captures the penalty to be incurred depending on the values of the neighboring pixels in the image. The actual choice of penalty term can be guided by the previously-described secondary information about the object being imaged. For example, if it is known that the reconstruction output should be smooth, then the second penalty term above may be more appropriate. However, it may create false artifacts across the boundaries of different segments of the image. To avoid this, the selection of penalty term may further be guided by secondary information based on segmented image components.

The spatio-temporal reconstruction problem described above can be solved using known optimization techniques such as, for example, gradient descent, conjugate gradient descent, or preconditioned conjugate gradient descent, using one of the objective functions.

Figure 3:
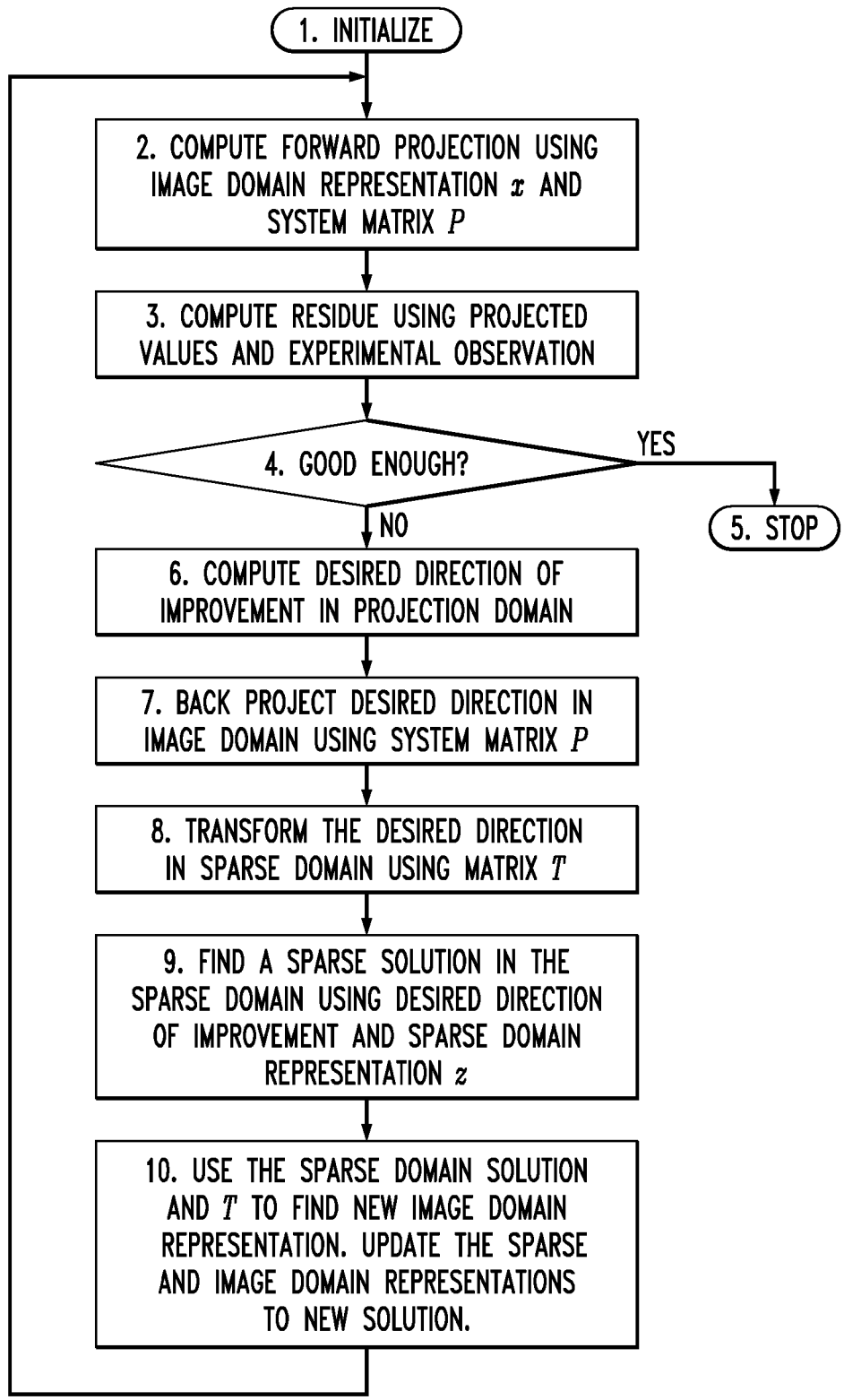
FIG. 3 is a flow diagram of an image reconstruction process implemented in the image reconstruction module of FIG. 2.

Referring now to FIG. 3, a flow diagram of the spatio-temporal image reconstruction process implemented in image reconstruction unit 106 is shown. The process in this particular embodiment includes Steps 1 through 10, each of which will be described below.

Step 1. The image domain representation is initialized, for example, to constant value, or by running an analytical reconstruction algorithm such as OSEM3D, which is described in I.K. Hong et al., "Ultra fast symmetry and simd-based projection-backprojection (ssp) algorithm for 3-d pet image reconstruction," IEEE Trans. Med. Imaging, 26(6):789-803, 2007. Although not explicitly indicated in this step of the figure, the initialized image may then be transformed using the transform T to obtain an initial transform domain representation.

Step 2. The projections $Y^i$ are computed using image domain representation x and system matrix P.

Step 3. A residue is computed, using projected values and experimental observation, in order to quantify the quality of the current solution. This may involve, for example, checking the value of one of the norms (e.g., L2 norm) of $(Y-Y^i-\Psi)$, checking if the desired number of iterations has been performed, etc.

Step 4. A determination is made as to whether or not the residue computed in Step 3 indicates that the current solution is of sufficient quality.

Step 5. The process ends if the current solution is of sufficient quality, and otherwise proceeds to Step 6.

Step 6. The desired direction of improvement in the projection domain is computed using any iterative optimization technique as applied to the objective function. As indicated above, one example of a suitable optimization technique is gradient descent. These and other known optimization techniques are described in, for example, Jan A. Snyman, "Practical Mathematical Optimization: An Introduction to Basic Optimization Theory and Classical and New Gradient-Based Algorithms," Springer Publishing (2005), ISBN 0-387-24348-8.

Step 7. The projection domain desired direction of improvement is back projected using P to get the desired direction of improvement in the image domain representation x. As indicated previously, forward and back projection methods are known in the art, and therefore will not be described in detail herein.

Step 8. The image domain desired direction of improvement is transformed into the sparse domain desired direction of improvement using T.

Step 9. A sparse solution is found in the sparse domain using the desired direction of improvement and the sparse domain representation z.

Step 10. An updated image x is obtained from the sparse domain solution using T and the sparse and image domain representations are updated to the new solution. The process then returns to Step 2 as shown, and continues in an iterative manner until the solution converges to an acceptable result.

The particular image reconstruction process shown in FIG. 3 is presented by way of illustrative example only, and other embodiments may utilize other arrangements of process steps to reconstruct a spatio-temporal image.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. A given computer readable medium of this type may be part of or otherwise associated with a processor such as the above-noted GPUs.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). A given computer or server may comprise one or more processors, such as the above-noted GPUs.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should therefore again be emphasized that the various embodiments described herein are presented by way of illustrative example only, and should not be construed as limiting the scope of the invention. For example, alternative embodiments of the invention can utilize different image processing system and image reconstruction unit configurations, and different reconstruction processes, than those described above in the context of the illustrative embodiments. Also, although particularly well suited for use in medical imaging applications, the disclosed techniques can be adapted in a straightforward manner for use in a wide variety of other imaging applications, including 2D or 3D movies involving people and/or models. These and numerous other alternative embodiments within the scope of the appended claims will be readily apparent to those skilled in the art.

What is claimed is:

1. A method of generating a reconstructed spatio-temporal image, the method comprising the steps of:
   (a) generating a projection domain representation based on an image domain representation of an object;
   (b) determining a desired direction of improvement in the projection domain representation;
   (c) transforming the desired direction of improvement to a sparse domain;

(d) obtaining a sparse domain representation based on the transformed desired direction of improvement in the sparse domain;

(e) generating an updated image domain representation based on the sparse domain representation;

(f) repeating steps (a) through (e) one or more times, each such time using the updated image domain representation generated in step (e) to generate the projection domain representation in step (a), until the updated image representation generated in step (e) satisfies one or more image quality criteria; and (g) outputting the updated image domain representation as the reconstructed spatio-temporal image;

wherein steps (a) through (g) are performed by a processing device comprising a processor coupled to a memory.

2. The method of claim 1 wherein a given one of the image domain representations x is related to a corresponding sparse domain representation z by a transform T as x=Tz.

3. The method of claim 2 wherein the transform T comprises a spatio-temporal transformation implemented using a plurality of basis functions.

4. The method of claim 3 wherein the plurality of basis functions includes one or more spatial only basis functions each multiplied by a temporal function.

5. The method of claim 3 wherein the plurality of basis functions includes one or more temporal only basis functions each multiplied by a spatial function.

6. The method of claim 3 wherein the plurality of basis functions includes one or more spatio-temporal basis functions.

7. The method of claim 3 wherein the plurality of basis functions includes at least one cross product of a spatial basis function and a temporal basis function.

8. The method of claim 3 wherein one or more of the basis functions are determined at least in part based on secondary information associated with the imaged object.

9. The method of claim 3 wherein the spatio-temporal transformation is represented as a matrix of dimension nd by $(n_s \cdot n_t + n_{st})$ and wherein the transformation is implemented using $n_s$ spatial basis functions, $n_t$ temporal basis functions and $n_{st}$ spatio-temporal basis functions.

10. A computer program product comprising a non-transitory computer readable storage medium having computer readable program code embodied therewith, the computer readable program code comprising computer readable program code configured to perform the steps of the method of claim 1.

11. A method of generating an image, the method comprising:

obtaining captured data characterizing an object;

reconstructing a spatio-temporal image of the object based on the captured data, the spatio-temporal image comprising a plurality of spatial images in respective time intervals, with at least a given one of the spatial images in one of the time intervals being reconstructed using captured data from a frame associated with that time interval and captured data associated with one or more additional frames associated with other time intervals; and outputting the spatio-temporal image;

wherein the obtaining, reconstructing and outputting steps are performed by a processing device comprising a processor coupled to a memory; and wherein the step of reconstructing the spatio-temporal image comprises: (a) generating a projection domain representation based on an image domain representation of the object; (b) determining a desired direction of improvement in the projection domain representation; (c) transforming the desired direction of improvement to a sparse domain; (d) obtaining a sparse domain representation based on the transformed desired direction of improvement in the sparse domain; (e) generating an updated image domain representation based on the sparse domain representation; (f) repeating steps (a) through (e) one or more times, each such time using the updated image domain representation generated in step (e) to generate the projection domain representation in step (a), until the updated image representation generated in step (e) satisfies one or more image quality criteria.

12. The method of claim 11 wherein the step of reconstructing a spatio-temporal image further comprises obtaining a solution to a minimization or maximization problem in a sparse domain and transforming the solution to an image domain.

13. The method of claim 12 wherein the maximization or minimization problem is based on one of a log-likelihood objective function and a least square objective function.

14. The method of claim 13 wherein the log-likelihood objective function is given by:

$$f(Y, \underline{P}, T, z, \psi) = \sum_{i=0}^{i=md-1} Y_i \log(\underline{P}Tz - \psi)_i - (\underline{P}Tz - \psi)_i - \log Y_i + R(x)$$

where Y is a projection domain representation, T is a transformation matrix between the image domain and the sparse domain, $\underline{P}$ is a block diagonal system matrix, z is a sparse domain representation, x=Tz is an image domain representation, ψ represents spatio-temporal noise, and R(x) is a penalty term.

15. The method of claim 13 wherein the least square objective function is given by:

$$f(Y,\underline{P},T,z,\psi)=\|Y-\underline{P}Tz-\psi\|^2-R(x)$$

where Y is a projection domain representation, T is a transformation matrix between the image domain and the sparse domain, P is a block diagonal system matrix, z is a sparse domain representation, x=Tz is an image domain representation, ψ represents spatio-temporal noise, and R(x) is a penalty term.

16. A computer program product comprising a non-transitory computer readable storage medium having computer readable program code embodied therewith, the computer readable program code comprising computer readable program code configured to perform the steps of the method of claim 11.

17. An apparatus comprising:

an image reconstruction unit;

the image reconstruction unit comprising a processor;

wherein the image reconstruction unit is operative under control of the processor to obtain captured data characterizing an object, and to reconstruct a spatio-temporal image of the object based on the captured data; and wherein the spatio-temporal image comprises a plurality of spatial images in respective time intervals and at least a given one of the spatial images in one of the time intervals is reconstructed using captured data from a frame associated with that time interval and captured data associated with one or more additional frames associated with other time intervals; and wherein reconstructing the spatio-temporal image comprises: (a) generating a projection domain representation based on an image domain representation of the object; (b) determining a desired direction of improvement in the projection domain representation; (c) transforming the desired direction of improvement to a sparse domain; (d) obtaining a sparse domain representation based on the transformed desired direction of improvement in the sparse domain; (e) generating an updated image domain representation based on the sparse domain representation; (f) repeating steps (a) through (e) one or more times, each such time using the updated image domain representation generated in step (e) to generate the projection domain representation in step (a), until the updated image representation generated in step (e) satisfies one or more image quality criteria.

18. The apparatus of claim 17 wherein the image reconstruction unit is operative to reconstruct the spatio-temporal image by obtaining a solution to a minimization or maximization problem in a sparse domain and transforming the solution to an image domain.

19. The apparatus of claim 17 wherein the image reconstruction unit comprises a sparse regression module and secondary information module.

20. The apparatus of claim 17 wherein the image reconstruction unit is implemented in a computer.

21. An integrated circuit comprising the apparatus of claim 17.

* * * * *